United States Patent [19]
Hasegawa

[11] Patent Number: 5,343,480
[45] Date of Patent: Aug. 30, 1994

[54] SYSTEM FOR DETECTING LOSS OF MESSAGE

[75] Inventor: Syuichi Hasegawa, Numazu, Japan

[73] Assignee: Fujitsu Limited, Kawasaki, Japan

[21] Appl. No.: 974,349

[22] Filed: Nov. 10, 1992

Related U.S. Application Data

[63] Continuation of Ser. No. 550,693, Jul. 10, 1990, abandoned.

[30] Foreign Application Priority Data

Jul. 10, 1989 [JP] Japan .................................. 1-177450

[51] Int. Cl.$^5$ .............................................. H04L 1/14
[52] U.S. Cl. ................................. 371/34; 364/DIG. 1
[58] Field of Search .................... 371/33, 34; 364/200, 364/281.3, 281.4, 281.9

[56] References Cited

U.S. PATENT DOCUMENTS

| | | | |
|---|---|---|---|
| 4,082,922 | 4/1978 | Chu | 371/33 |
| 4,530,051 | 7/1985 | Johnson et al. | 364/200 |
| 4,630,196 | 12/1986 | Bednar, Jr. et al. | 364/200 |
| 4,649,473 | 3/1987 | Hammer et al. | 364/200 |
| 4,720,850 | 1/1988 | Oberlander et al. | 370/62 |
| 4,835,685 | 5/1989 | Kun | 364/200 |

OTHER PUBLICATIONS

David B. Johnson et al., Sender-Based Message Logging, pp. 14–18, Digest of Papers of the 17th International Symposium on Fault-Tolerant Computing, Jul. 6, 1987, Pittsburgh, Pa., U.S.A.

Primary Examiner—Robert W. Beausoliel, Jr.
Assistant Examiner—Glenn Snyder
Attorney, Agent, or Firm—Staas & Halsey

[57] ABSTRACT

A system and method for detecting a loss of a message transmitted between first and second address spaces of a computer system. The system includes a first sequence number adding part adding a first sequence number to a transmission message transmitted from the first address space to the second address space, a reception message loss detecting part detecting a loss of a reception message received from the second address space, using a second sequence number added to the reception message, and a reception sequence number notifying part notifying the second sequence number added to the reception message to the second address space as a response message. The system also includes a second sequence number adding part adding the second sequence number to the reception message transmitted from the second address space to the first address space, a sequence number management part including a non-volatile memory storing the first and second sequence numbers, a sequence number resetting part reading the first and second sequence numbers from the non-volatile memory when the second address space is destroyed and recreated, a first message loss detecting part detecting a loss of the transmission message transmitted from the first address space using the first sequence number added to the transmission message, and a second message loss detecting part for detecting a loss of the reception message transmitted from the second address space.

8 Claims, 8 Drawing Sheets

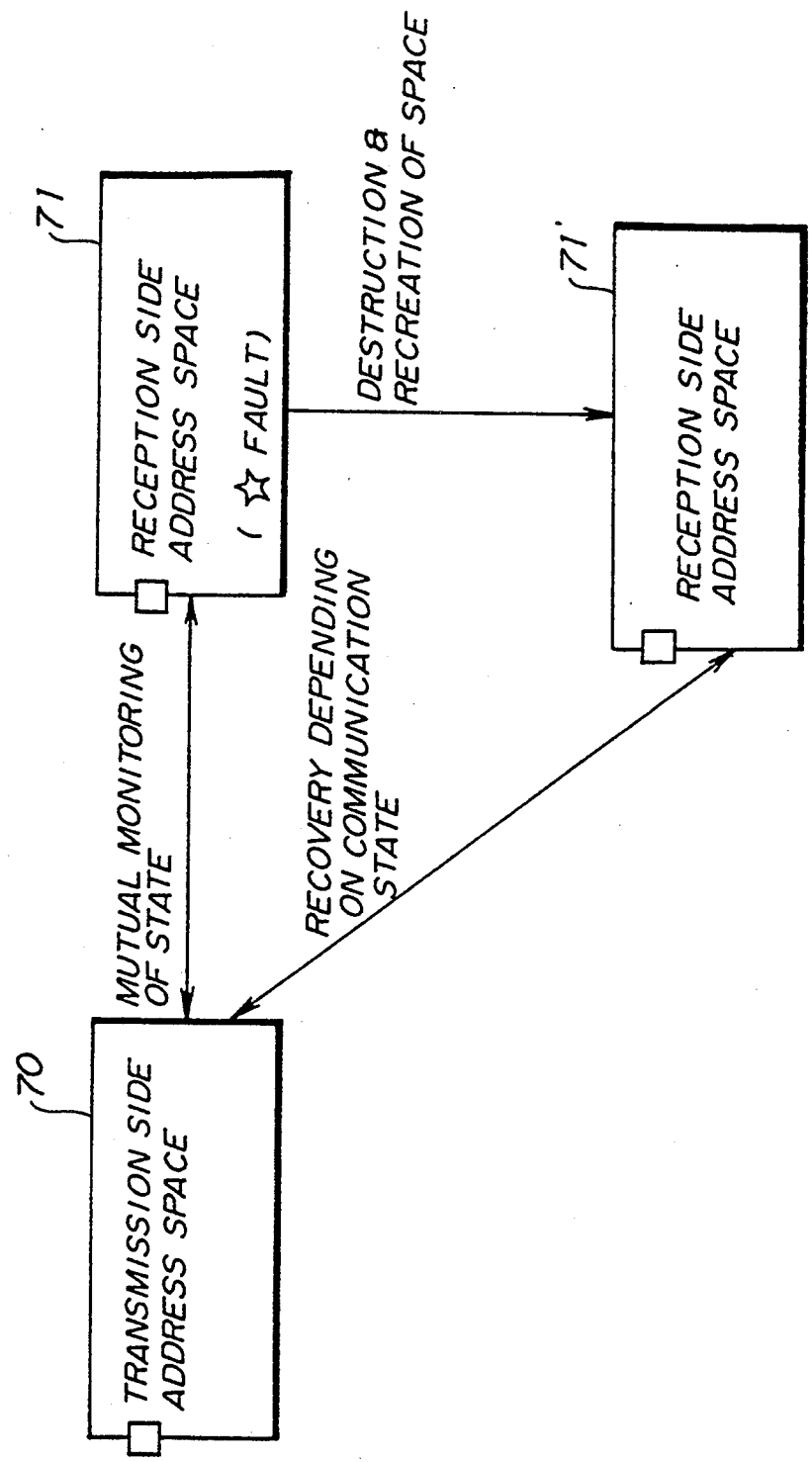

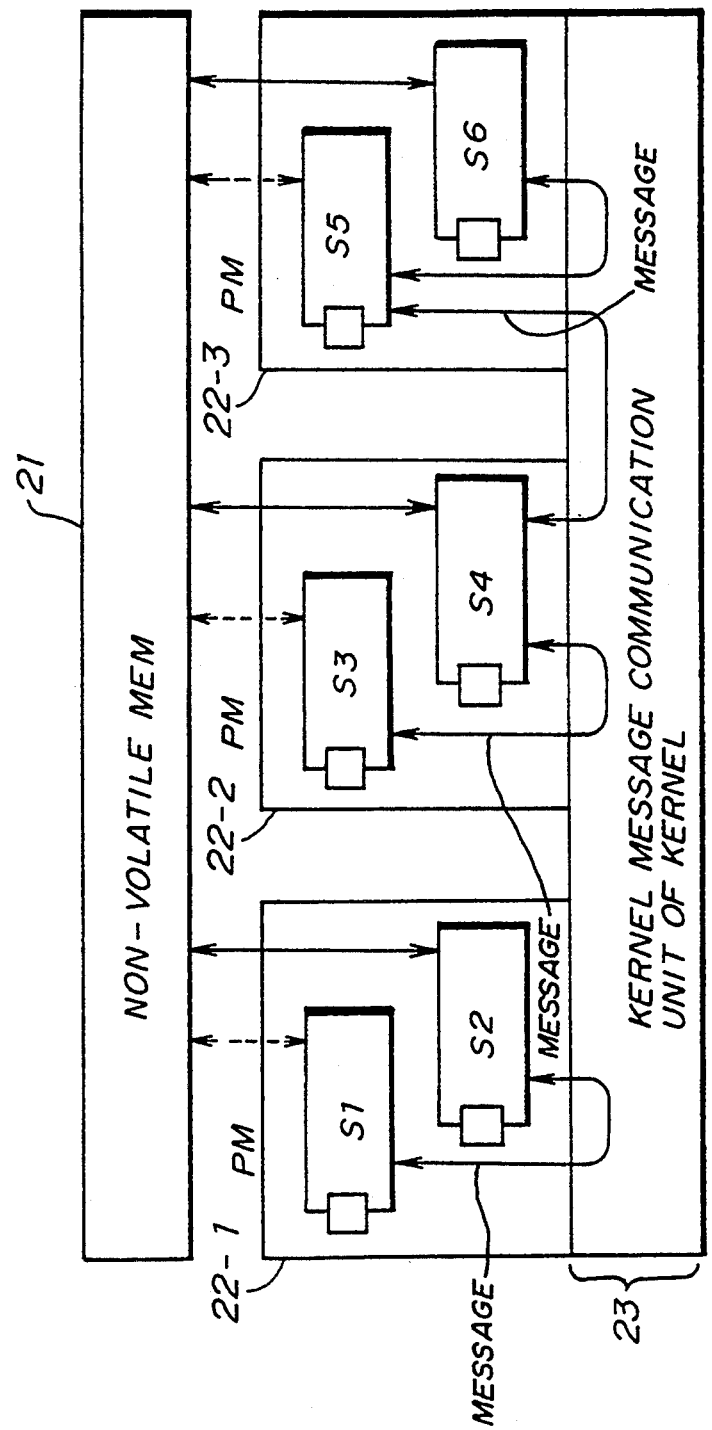
F I G. 3

SYSTEM FOR DETECTING LOSS OF MESSAGE

This application is a continuation of application Ser. No. 07/550,693, filed Jul. 10, 1990, now abandoned.

BACKGROUND OF THE INVENTION

The present invention generally relates to systems for detecting loss of messages, and more particularly to a system for detecting loss of a message in a computer system in which a message communication is made between first and second address spaces.

In a message based operating system and the like, it is desirable that the message communication is carried out efficiently and that a message which is lost during a fault is detectable so that a recovery can be made.

A computer system which uses a message based operating system is conceivable wherein a communication between independent address spaces is carried out by a message which is provided by a kernel message communication control unit of a kernel. In such a system environment, the relationship between the independent address spaces is sparse. For this reason, a certain address space is operable independently of a destruction or creation of another address space which has a communication relationship with the certain address space. However, there is a possibility that a message is lost by the destruction of the address space, and it is necessary to provide a mechanism for efficiently detecting the lost message.

The following three kinds of measures are conceivable with respect to the message lost during the communication.

According to a first system shown in FIG. 1A, monitoring and confirmation are carried out between address spaces. Address spaces 70 and 71 which have a communication relationship, and each address space monitors the destruction or creation of the other address space. The address space which detects the destruction of the other address space interrupts a new message transmission. In addition, when the destroyed address space is recreated, the two address spaces 70 and 71 confirm the communication state before the destruction of the address space and carry out an appropriate recovery process.

On the other hand, a second system shown in FIG. 1B employs the procedure of giving an immediate answer to each question. In other words, the transmission side address space 70 sends a message to the reception side address space 71, and the reception side address space 71 sends an answer to the transmission side address space 70 in response to the message. Therefore, the transmission side address space 70 can confirm whether or not the message is correctly received by the reception side address space 71.

A third system shown in FIG. 1C employs a message recreation mechanism provided by a kernel message communication control unit 23 of a kernel. Even when the reception side address space 71 is destroyed during the processing of the received message, the provision of the control unit 23 makes it possible to receive the same message by another address space 71' which is recreated.

However, the conceivable systems described above suffer from the following problems.

According to the first system shown in FIG. 1A, even when no message is actually lost, a confirmation procedure for detecting whether or not a message is lost is constantly required in both the address spaces 70 and 71 when a crash is generated. It is difficult to increase the independence of the address space, and there is a problem in that it is difficult to fully bring out the effects of making the relationship between the address spaces 70 and 71 sparse.

On the other hand, according to the second system shown in FIG. 1B, the procedure of giving an immediate answer to each question is employed for all messages. For this reason, there is a problem in that the overhead is large in a stationary state.

According to the third system shown in FIG. 1C, the following problems occur because the kernel stores a transmission message in a kernel buffer to prepare for a retransmission. In other words, the transmission side address space 70 in many cases stores data for retransmission in case of an erroneous process, and in addition, there is a procedure between the two address spaces 70 and 71 for determining which data is to be retransmitted first. For this reason, in the kernel in which the message is uniformly stored in the kernel buffer, the utilization efficiency of the memory is poor and the performance overhead is large.

SUMMARY OF THE INVENTION

Accordingly, it is a general object of the present invention to provide a novel and useful system for detecting loss of message in which the problems described above are eliminated.

Another and more specific object of the present invention is to provide a system for detecting a loss of a message which is transmitted between first and second address spaces of a computer system, comprising first sequence number adding means for adding a first sequence number to a transmission message which is transmitted from the first address space to the second address space, reception message loss detecting means for detecting a loss of a reception message which is received from the second address space by the first address space based on a second sequence number which is added to the reception message and, reception sequence number notifying means for notifying the second sequence number which is added to the reception message to the second address space in a form of a response message either automatically or in response to a request from the first address space. The present invention also comprises second sequence number adding means for adding the second sequence number to the reception message which is transmitted from the second address space to the first address space, sequence number management means including a non-volatile memory for storing the first and second sequence numbers, sequence number resetting means for reading the first and second sequence numbers from the non-volatile memory when the second address space is destroyed by a fault and recreated thereafter, first message loss detecting means for detecting a loss of the transmission message which is transmitted from the first address space based on the first sequence number which is added to the transmission message, and second message loss detecting means for detecting a loss of the reception message which is transmitted from the second address space based on a comparison of the second sequence number which is stored in the non-volatile memory and the second sequence number which is notified by the response message which is transmitted from the first address space. According to the system of the present invention, it is possible to minimize the overhead for detecting the loss of the message. In addition, when the first and second address spaces are respectively applied to the application program address space and the communication access address space and the communication access address space is destroyed and recreated thereafter, no special process is required in the application program if no loss of message actually occurs. In other words, the first address space need not be sensitive to the destruction and recreation of the second address space. For this reason, the independence of the address spaces is improved.

Other objects and further features of the present invention will be apparent from the following detailed description when read in conjunction with the accompanying drawings.

BRIEF DESCRIPTION OF THE DRAWINGS

FIGS. 1A through 1C respectively are system block diagrams for explaining conceivable systems for detecting loss of message;

FIG. 3 is a system block diagram showing an embodiment of the system for detecting loss of message according to the present invention;

DESCRIPTION OF THE PREFERRED EMBODIMENTS

Figure 1B:
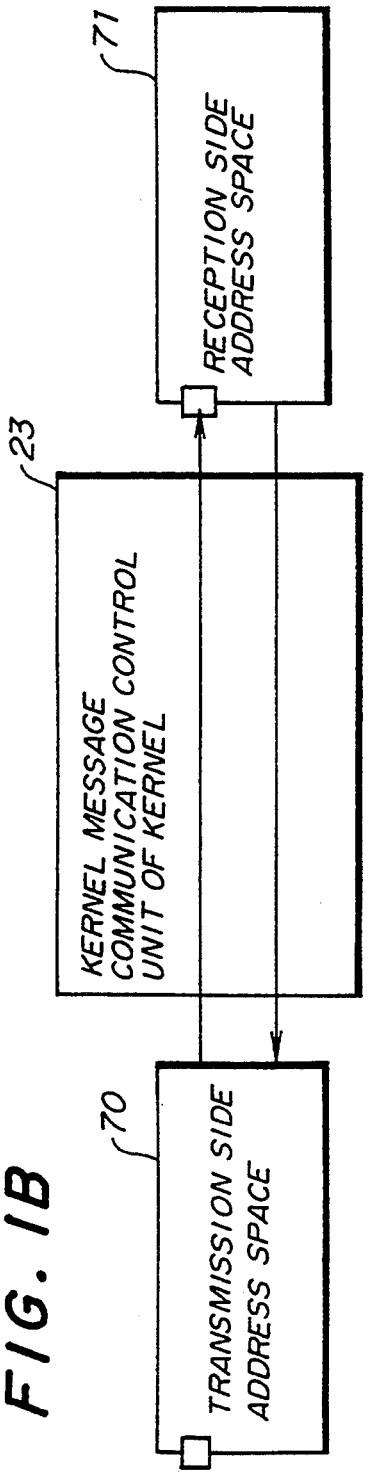
Figure 1C:
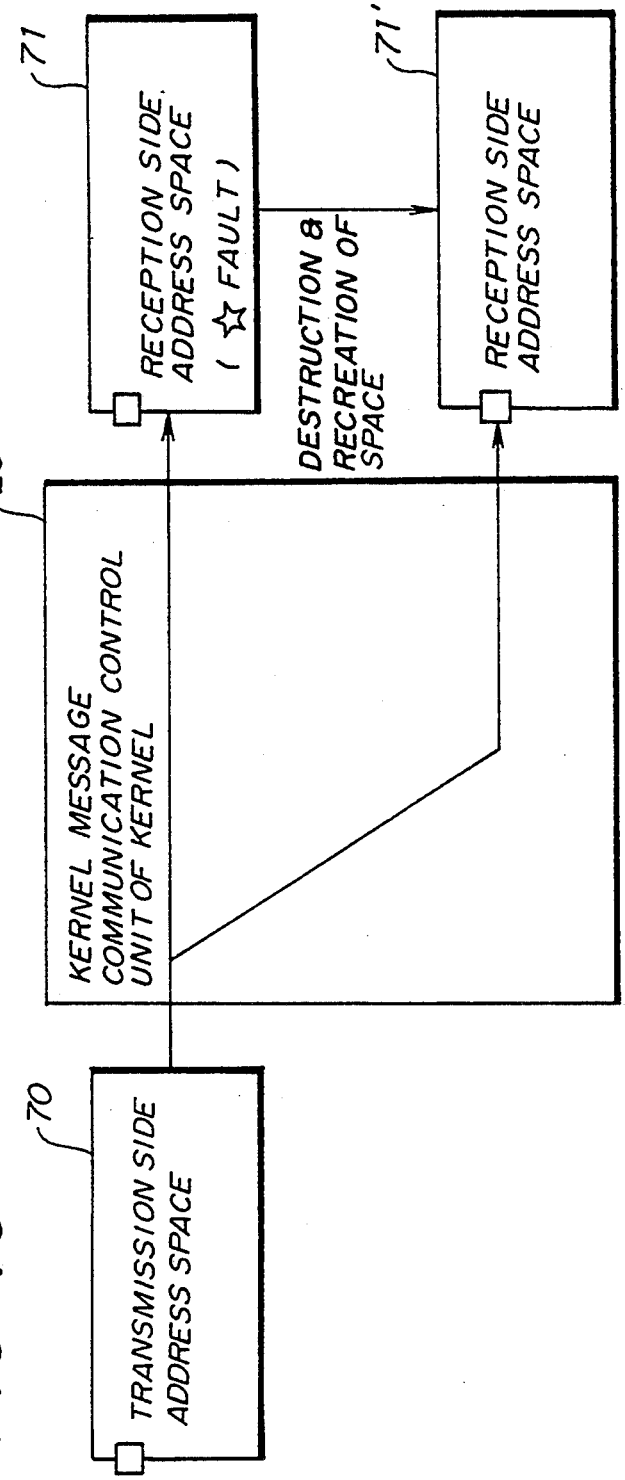
Figure 2:
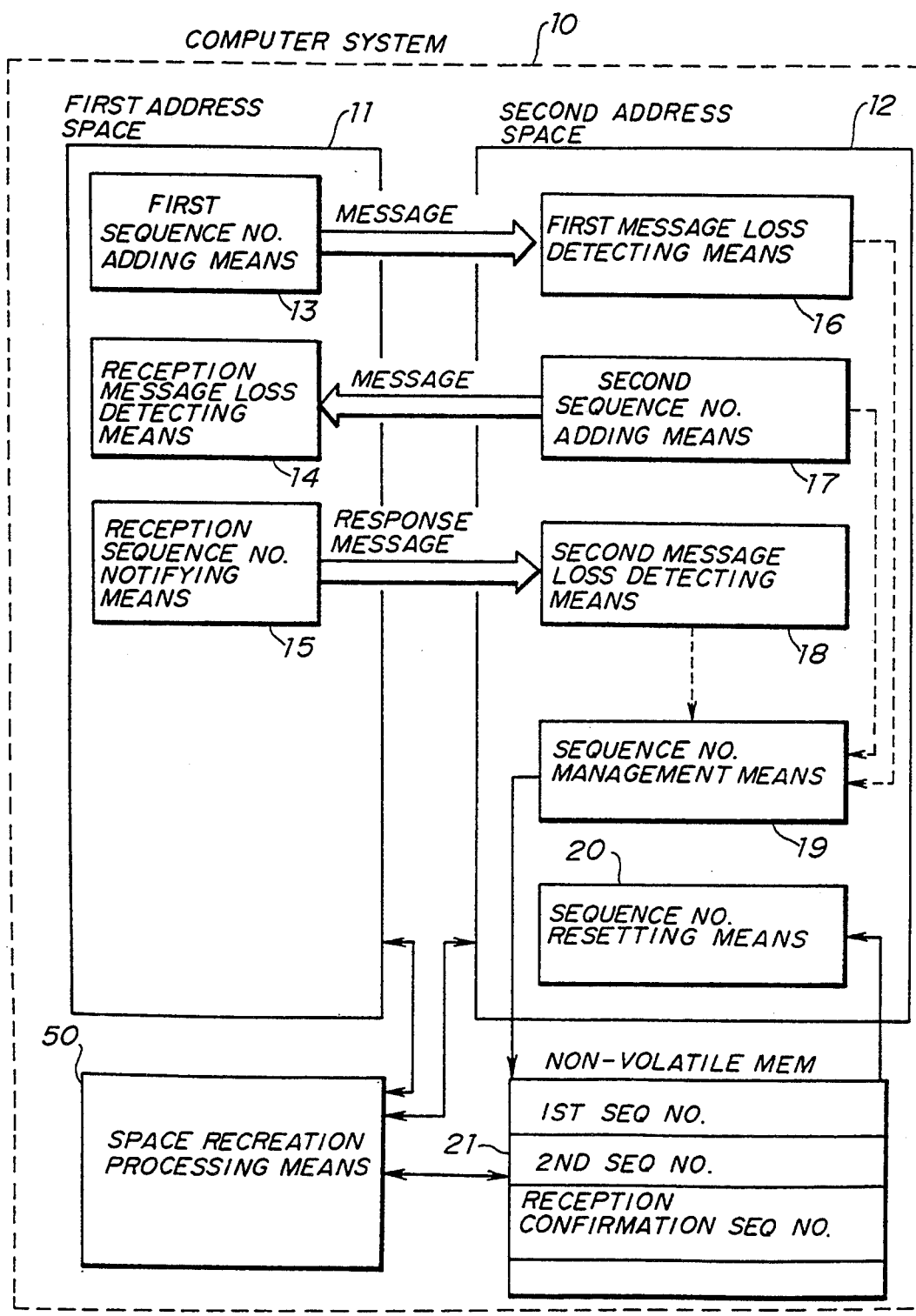
FIG. 2 is a system block diagram for explaining an operating principle of a system for detecting loss of message according to the present invention.

First, a description will be given of an operating principle of a system for detecting loss of message according to the present invention, by referring to FIG. 2. In FIG. 2, a computer system 10 includes one or a plurality of processors and has a function of carrying out a message communication between a first address space 11 and a second address space 12. The following means are provided for the purpose of detecting a message which is lost during a time interval from a destruction of the second address space 12 due to a fault to a recreation of the address space.

The first address space 11 includes a sequence number adding means 13, a reception message loss detecting means 14, and a reception sequence number notifying means 15.

The sequence number adding means 13 adds a first sequence number to a transmission message which is transmitted to the second address space 12.

The reception message loss detecting means 14 detects a loss of a reception message which is received from the second address space 12 based on a second sequence number which is added to the reception message.

The reception sequence number notifying means 15 notifies the second sequence number which is added to the reception message to the second address space 12 in the form of a response message in response to a request from the first address space 11 or automatically.

The second address space 12 includes a first message loss detecting means 16, a sequence number adding means 17, a second message loss detecting means 18, a sequence number management means 19, and a sequence number resetting means 20.

The first message loss detecting means 16 detects a loss of the transmission message which is transmitted from the first address space 11 and received by the second address space 12 based on the first sequence number which is added to the transmission message.

The sequence number adding means 17 adds the second sequence number to the reception message which is transmitted from the second address space 12 and received by the first address space 11.

The second message loss detecting means 18 detects a loss of the reception message which is transmitted from the second address space 12 and received by the first address space 11 based on a comparison of the second sequence number which is managed by the sequence number management means 19 and the second sequence number which is notified by the response message received from the first address space 11.

The sequence number management means 19 stores in a non-volatile memory 21 the first and second sequence numbers related to the transmission and reception messages. The non-volatile memory 21 has a backup power source, however, it is of course possible to use other types of external memory devices such as a magnetic disk unit.

The sequence number resetting means 20 reads the first and second sequence numbers from the non-volatile memory 21 when an address space is recreated after the second address space 12 is destroyed due to a fault. In addition, the sequence number resetting means 20 sets the read first and second sequence numbers into an internal control table which is provided for the purpose of checking message loss.

Accordingly, when the second address space 12 is destroyed by a fault and recreated thereafter, a message which is lost during a time interval from a destruction of the second address space 12 to a recreation of the address space is detected in the following manner.

First, the sequence number adding means 13 of the first address space 11 adds a first sequence number to the transmission message which is transmitted to the second address space 12. On the other hand, in the second address space 12, the first message loss detecting means 16 checks the first sequence number of the transmission message which is received from the first address space 11, and the sequence number management means 19 stores this first sequence number in the non-volatile memory 21.

Second, when the second address space 12 is destroyed by a fault and recreated thereafter, the sequence number resetting means 20 reads the first sequence number from the non-volatile memory 21. The checking of the first sequence number is continued similarly as before the destruction of the second address space 12.

On the other hand, the following process is carried out to detect whether or not the reception message which is to be transmitted from the second address space 12 to the first address space 11 is lost.

First, the sequence number adding means 17 of the second address space 12 adds a second sequence number to the reception message which is transmitted from the second address space 12 to the first address space 11.

Second, with respect to an arbitrary reception message which is transmitted from the second address space 12 and received by the first address space 11, the second address space 12 can make a request to the first address space 11 requesting that the first address space 11 transmit a response message which guarantees a correct reception of the arbitrary reception message. Alternatively, the first address space 11 voluntarily returns the response message to the second address space 12 at an appropriate time.

Third, the second address space 12 stores in the non-volatile memory 21 the second sequence number which is added to the reception message which is transmitted from the second address space 12 and received by the first address space 11 and the second sequence number which is notified by the response message which is transmitted from the first address space 11 to the second address space 12.

Fourth, when the second address space 12 is destroyed by a fault and recreated thereafter, the second sequence numbers are read out from the non-volatile memory 21 and the second sequence number added to the reception message is compared with the second sequence number which is notified by the response message. When the two compared second sequence numbers match, there is no loss of the reception message which is transmitted from the second address space 12 and received by the first address space 11. On the other hand, there is a possibility that the reception message is lost when the two compared second sequence numbers are different.

Next, a description will be given of an embodiment of the system for detecting loss of message according to the present invention, by referring to FIG. 3. In this embodiment, the present invention is applied to a computer system having a message based operating system.

The computer system shown in FIG. 3 includes a non-volatile memory 21, processor modules 22-1 through 22-3 respectively provided with a central processing unit (CPU) and a local memory, a kernel message communication control unit 23 of a kernel of a distributed operating system, and virtual storage address spaces S1 through S6 in which programs operate.

In the computer system shown in FIG. 3, the communications among the individual address spaces S1 through S6 are carried out by message communications provided by the communication control unit 23.

When a hardware or software fault occurs, only the address space which is affected by the fault is destroyed. In this case, there is a possibility that a message transmitted to an address space is lost by the destruction of this address space. A function which is lost by the destruction of the address space is substituted by an equivalent function immediately after or after a predetermined time from the destruction of the address space by recreating in another address space the state immediately before the destruction of the address space.

The non-volatile memory 21 which is unaffected by the destruction of the address space can be used from each of the address spaces S1 through S6.

A description will now be given of the operation of the embodiment for a case where an application program address space is applied to the first address space 11 shown in FIG. 2 and a communication access address space is applied to the second address space 12 shown in FIG. 2, by referring to FIGS. 4 through 7.

Figure 4:
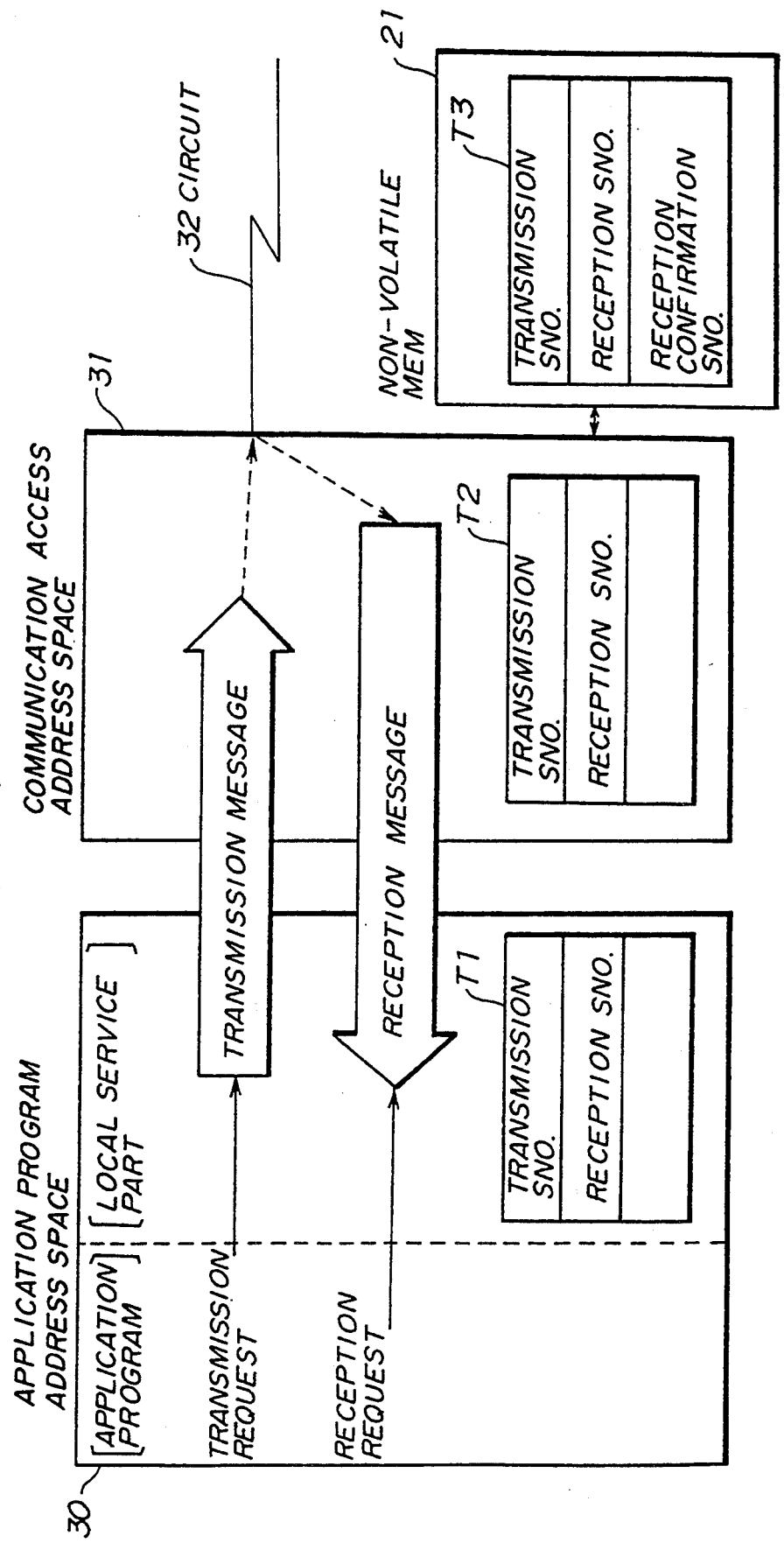
FIG. 4 is a diagram for explaining message transmission and reception of the embodiment.

FIG. 4 shows an application program address space 30, a communication access address space 31 in which a communication access program for carrying out a communication control operates, a circuit 32, and control tables T1 through T3.

The application program address space 30 and the communication access address space 31 may either exist within the same processor module shown in FIG. 3 or within different processor modules shown in FIG. 3.

An application program for requesting a communication operates in the application program address space 30. In addition, a local service part for providing a part of the function of the communication access operates in the application program address space 30 as a software interface to the communication access.

Responsive to a transmission request from the application program, a transmission message is sent to the communication access address space 31 and then to the circuit 32. In addition, responsive to a reception request, a reception data from the circuit 32 is sent to the application program address space 30 as a reception message. When making such transmission and reception of the message, it is necessary to take measures so that the application program address space 30 is not affected even when the communication access address space 31 is destroyed due to a fault, and so that it is possible to detect and notify the loss of a message.

For this reason, in the communication access address space 31, the first and second sequence numbers of the respective transmission and reception messages are managed and stored in the non-volatile memory 21. In this embodiment, the control tables T1 through T3 are used to manage the first and second sequence numbers in the following manner.

The control table T1 exists in the application program address space 30 and manages the communication state with respect to the other party. In this case, the control table T1 manages the first (transmission) sequence number transmitted to the communication access address space 31 and the second (reception) sequence number received from the communication access address space 31.

The control table T2 exists in the communication access address space 31 and manages the communication state with respect to the other party. In this case, the control table T2 manages the same information as the control table T1.

The control table T3 manages the communication state with respect to the other party. Even when the communication access address space 31 is destroyed, the content of the communication access address space 31 is maintained by use of the non-volatile memory 21.

Figure 5:
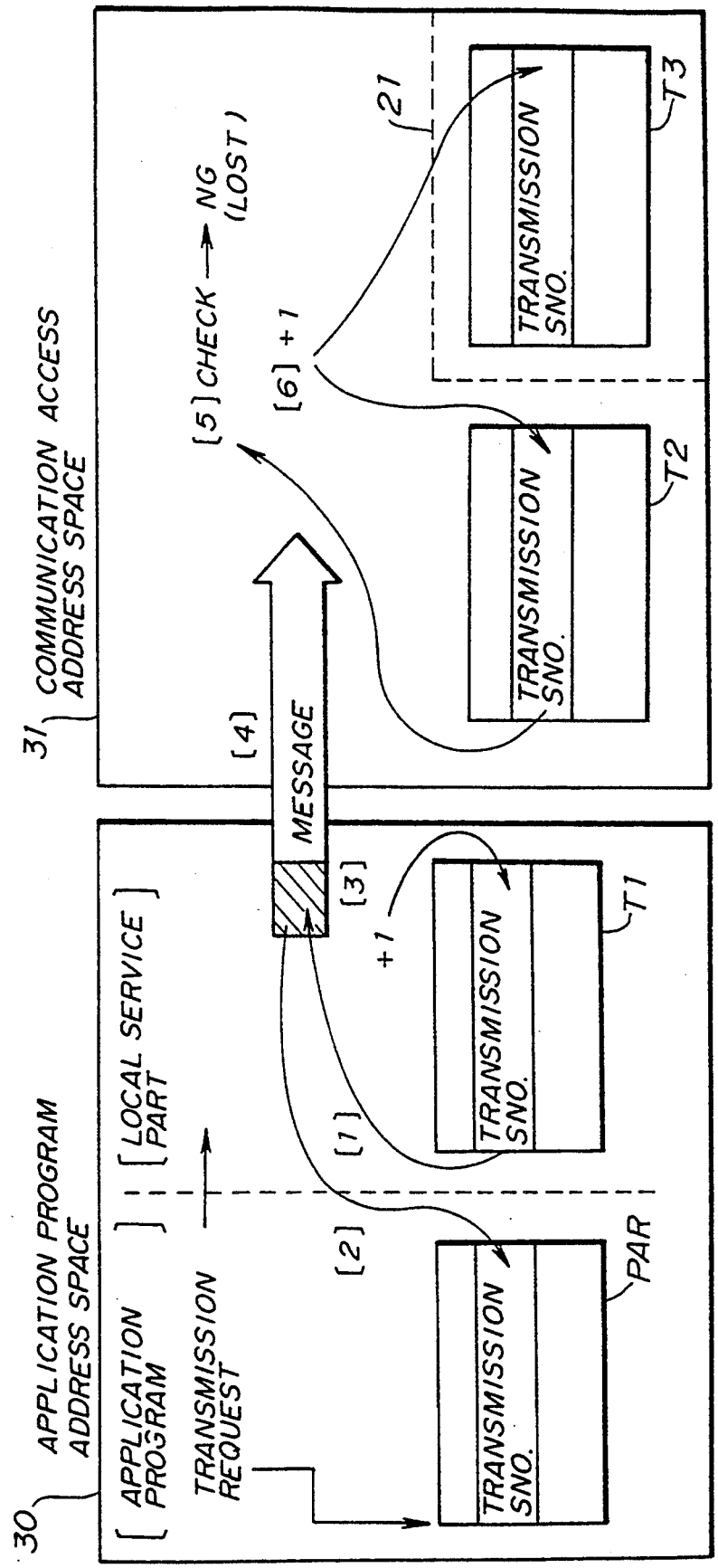
FIG. 5 is a diagram for explaining a process of the embodiment at the time of a transmission.

The process of transmitting the message from the application program address space 30 to the communication access address space 31 is carried out in a sequence of steps [1] through [6] shown in FIG. 5.

When a transmission request is made from the application program, a step [1] adds the first (transmission) sequence number which is managed by the control table T1 to the transmission message which is to be transmitted from the application program address space 30 to the communication access address space 31.

A step [2] sets the first sequence number in a parameter PAR of the transmission request.

Thereafter, a step [3] adds "1" to the first sequence number to prepare for the next transmission.

A step [4] transmits the transmission message to the communication access address space 31.

In the communication access address space 31, a step [5] collates and checks the first sequence number within the transmission message and the first sequence number within the control table T2. When making an initial setting, measures are taken so that the sequence numbers within the control tables T1 and T2 have the same value.

When the two first sequence numbers have the same value as a result of the check, the transmission message is correctly transmitted and the process continues to a next step [6]. On the other hand, when the two first sequence numbers are different as a result of the check, the transmission message is lost. In this case, the loss of the transmission message is notified to the application program address space 30 and a retransmission request or the like is made.

When the two first sequence numbers are the same as a result of the check and correct, the step [6] adds "1" to the sequence numbers within the control tables T2 and T3.

Figure 6:
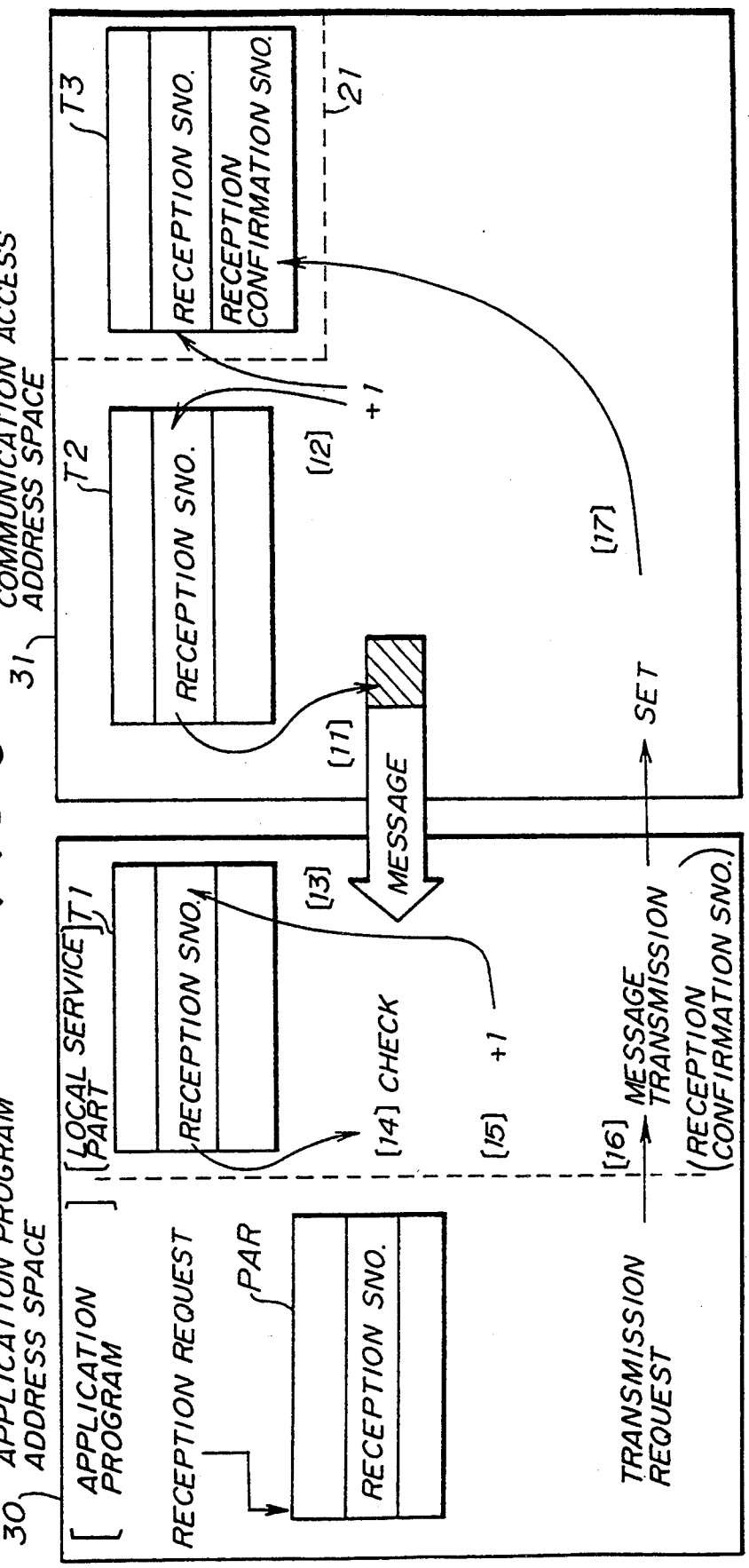
FIG. 6 is a diagram for explaining a process of the embodiment at the time of a reception.

The process of receiving the reception message from the communication access address space 31 by the application program address space 30 is carried out in a sequence of steps [11] through [17] shown in FIG. 6.

When a reception request is made from the application program, a step [11] adds the second (reception) sequence number which is managed in the control table T2 to the reception message which is received from the communication access address space 31 by the application program address space 30.

Thereafter, a step [12] adds "1" to the second sequence numbers within the control tables T2 and T3.

A step [13] transmits the reception message from the communication access address space 31 to the application access address space 30.

In the application program address space 30, a step [14] collates and checks the second sequence number within the reception message and the second sequence number within the control table T1. When making an initial setting, measures are taken so that the sequence numbers within the control tables T1 and T2 have the same value.

When the two second sequence numbers have the same value as a result of the check, the reception message is correctly received and the process continues to a next step [15]. On the other hand, when the two second sequence numbers are different as a result of the check, the reception message is lost. In this case, the loss of the reception message is notified from the local service part to the application program of the application program address space 30 and an appropriate recovery process is made if needed.

When the two second sequence numbers are the same as a result of the check and correct, the step [15] adds "1" to the sequence number within the control table T1.

In the application program address space 30, a step [16] returns a response message to the communication access address space 31 responsive to the reception message at an appropriate time. In this embodiment, the response message is returned to the communication access address space 31 simultaneously as the transmission of the next transmission message from the application program address space 30 to the communication access address space 31, so as to reduce the overhead required for returning the response message. The second sequence number of the newest reception message which is received by the application program address space 30 is set in the response message. The second sequence number of the newest reception message will hereinafter be referred to as a reception confirmation sequence number.

In the communication access address space 31, a step [17] recognizes that the reception message up to that having the reception confirmation sequence number notified by the response message is correctly received by the application program address space 30, and stores the reception confirmation sequence number within the control table T3 of the non-volatile memory 21. When the communication access address space 31 is destroyed by a hardware or software fault and is recreated as another address space, a process shown in FIG. 7 is carried out based on the result which is obtained by reading out the sequence numbers and the like from the non-volatile memory 21.

Figure 7:
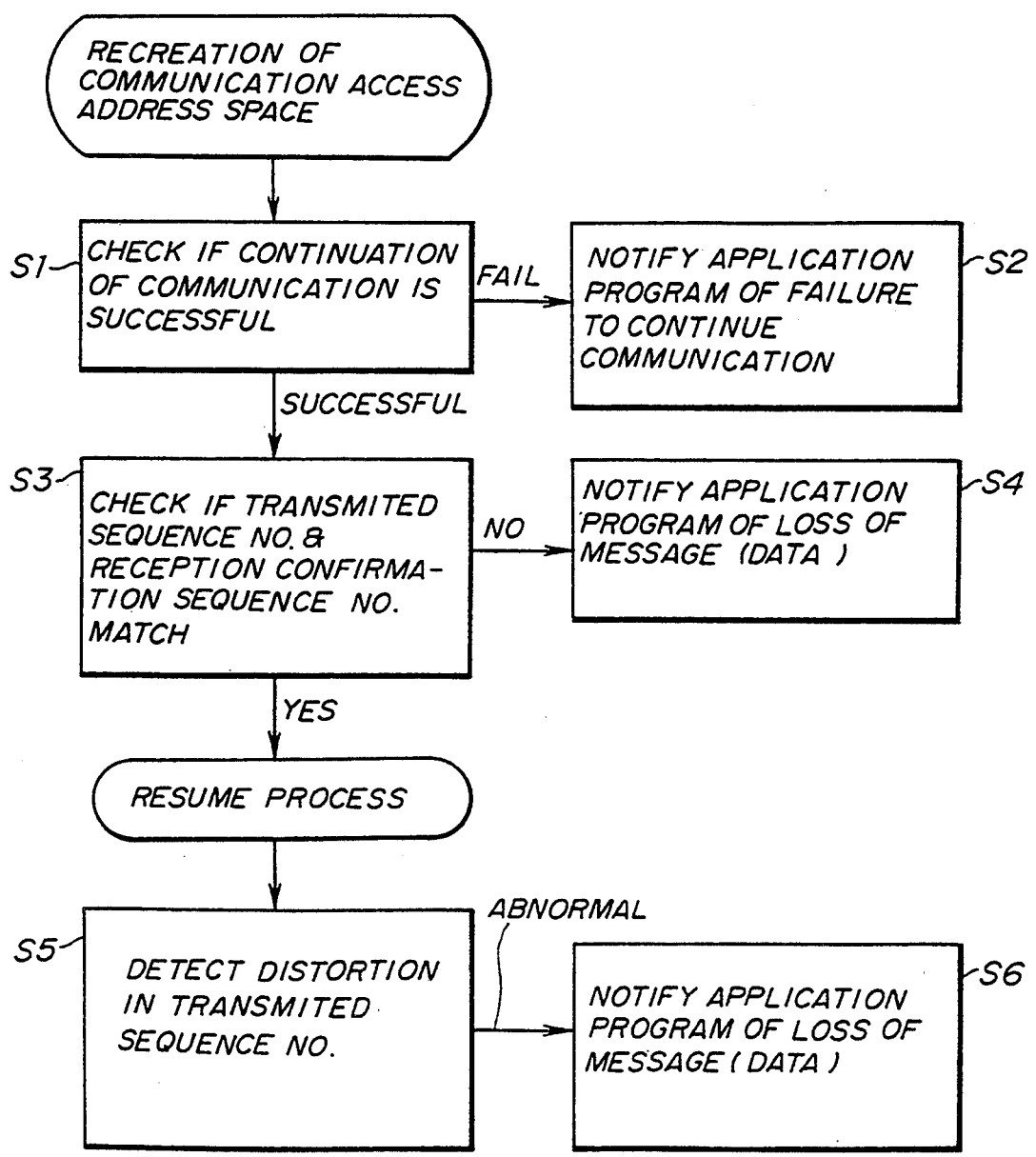
FIG. 7 is a flow chart for explaining a process of recreating address space in the embodiment.

The process shown in FIG. 7 is carried out by a space recreation processing means 50 shown in FIG. 2. In FIG. 7, a step S1 determines whether or not the communication is successfully continued. When the communication cannot be continued due to a hardware fault in the circuit system, for example, a step S2 notifies the application program of the unsuccessful continuation of the communication.

On the other hand, when the communication is successfully continued, a step S3 checks whether or not the second sequence number which is transmitted to the application program address space 30 and the reception confirmation sequence number from the application program address space 30 match for the data which is intended for the application program. When the two sequence numbers do not match, a step S4 notifies the application program that a loss of the reception message occurred.

But when the two sequence numbers match, the process is resumed and a step S5 detects a distortion in the first sequence number within the transmission message which is transmitted to the communication access address space 31, that is, for the data received from the application program. The reception data is destroyed until a reception data having the correct sequence number is received. When an abnormality is detected, the application program is notified of the loss of message. When the application program address space 30 is destroyed and the function of the application program address space 30 is resumed in another address space, the following process is carried out.

That is, an inquiry is made to the communication access requesting the first sequence number of the transmission message which is received by the communication access address space 31 and the second sequence number of the reception message which is transmitted from the communication access address space 31 to the application program address space 30. A recovery process is carried out if needed depending on the inquiry information and the information which is held by the application program itself.

Further, the present invention is not limited to these embodiments, but various variations and modifications may be made without departing from the scope of the present invention.

What is claimed is:

1. A system for detecting a loss of at least one of transmission, reception and response messages which is transmitted between first and second address spaces of a computer system, which loss may be caused by a fault, said system capable of using a request form the first address space, a response message, and a comparison, said system comprising:

first sequence number adding means for adding a first sequence number to the transmission message which is transmitted from the first address space to the second address space;

reception message loss detecting means for detecting the loss of the reception message which is received from the second address space by the first address space based on a second sequence number which is added to the reception message;

reception sequence number notifying means for notifying the second address space of the second sequence number which is added to the reception message as the response message given automatically or in response to the request from the first address space;

second sequence number adding means for adding the second sequence number to the reception message which is transmitted from the second address space to the first address space;

sequence number management means for controlling storage of the first and second sequence numbers;

a non-volatile memory for storing the first and second sequence numbers received from said sequence number management means;

sequence number resetting means for reading the first and second sequence numbers from said non-volatile memory when the second address space is destroyed by the fault and recreated thereafter;

first message loss detecting means for detecting the loss of the transmission message which is transmitted from the first address space based on the first sequence number which is added to the transmission message; and second message loss detecting means for detecting the loss of the reception message which is transmitted from the second address space based on the comparison of the second sequence number which is stored in said non-volatile memory and the second sequence number which is notified by the response message which is transmitted from the first address space;

said first sequence number adding means, said reception message loss detecting means and said reception sequence number notifying means being included in the first address space, said second sequence number adding means, said sequence number management means, said sequence number resetting means and said first and second message loss detecting means being included in the second address space, the first address space storing at least the first sequence number of the transmission message, and the second address space storing at least the second sequence number of the reception message.

2. The system as claimed in claim 1, wherein said first and second message loss detecting means detect the loss of at least one of the transmission, reception and response messages during a time interval which includes a time from a destruction of the second address space to a recreation of the second address space.

3. The system as claimed in claim 1, wherein the first address space includes a first control table for managing a communication state by storing the first sequence number of the transmission message and the second sequence number of the reception message, and wherein the second address space includes a second control table for managing the communication state by storing the second sequence number of the reception message and the first sequence number of the transmission message.

4. The system as claimed in claim 3, wherein said non-volatile memory includes a third control table which stores the first sequence number added to the transmission message, the second sequence number added to the reception message and the second sequence number included in the response message.

5. A system for detecting a loss of at least one of a transmission, reception, and response messages, comprising:

a first address space including
first sequence number adding means for including a first sequence number within the transmission message which is transmitted from said first address space,
reception message loss detecting means for detecting the loss of the reception message based on a second sequence number which is added to the reception message,
reception sequence number notifying means for transmitting the second sequence number of the reception message from said first address space; and a second address space including
second sequence number adding means for including a second sequence number within the reception message which is transmitted from said second address space,
first message loss detecting means for detecting the loss of the transmission message based on the first sequence number, and
second message loss detecting means for detecting the loss of the reception message based on the second sequence number; and a non-volatile memory storing the first sequence number included within the transmission message and the second sequence number included within the reception message, the first address space storing at least the first sequence number of the transmission message, and the second address space storing at least the second sequence number of the reception message.

6. A method for detecting a loss of at least one of transmission, reception, and response message transmitted between first and second address spaces, comprising the steps of:

a) including a first sequence number within the transmission message;

b) storing the first sequence number in the first address space;

c) transmitting the transmission message from the first address space to the second address space;

d) storing the first sequence number of the transmission message received by the second address space in a non-volatile memory;

e) including a second sequence number within the reception message which includes the first sequence number from the first address space;

f) storing the second sequence number in the non-volatile memory;

g) transmitting the reception message from the second address space to the first address space;

h) comparing the first sequence number of the reception message with the first sequence number stored in the first address space in said step b) to determine whether the loss occurred;

i) transmitting the response message which includes the second sequence number from the second address space, from the first address space to the second address space; and j) comparing the second sequence number of the response message with the second sequence number to determine whether the loss occurred.

7. A method as claimed in claim 6, further comprising the step of:
　k) reading at least one of the first sequence number of the transmission message received by the second address space and the second sequence number, from the non-volatile memory for use in determining whether at least one of the transmission, reception and response messages are lost after recovery from an occurrence of a fault resulting in destruction of one of the first and second address spaces.

8. A method as claimed in claim 6, wherein the first address space is an application program address space, and wherein the second address space is a communication access address space.

* * * * *

UNITED STATES PATENT AND TRADEMARK OFFICE
CERTIFICATE OF CORRECTION

PATENT NO. : 5,343,480
DATED : August 30, 1994
INVENTOR(S) : HASEGAWA

It is certified that error appears in the above-indentified patent and that said Letters Patent is hereby corrected as shown below:

Col. 2, line 41, "and," s/b --, and--.

Col. 8, line 60, "form" s/b --from--.

Col. 10, line 39, "message' s/b --messages--.

Signed and Sealed this

Thirteenth Day of December, 1994

Attest:

BRUCE LEHMAN

*Attesting Officer*  *Commissioner of Patents and Trademarks*